United States Patent
Pham et al.

(10) Patent No.: US 9,216,849 B2
(45) Date of Patent: Dec. 22, 2015

(54) CONTAINER HINGE

(71) Applicant: Inline Plastics Corp., Shelton, CT (US)

(72) Inventors: Steven Pham, Naugatuck, CT (US); Thomas Iaquinto, Clinton, CT (US)

(73) Assignee: Inline Plastics Corp., Shelton, CT (US)

( * ) Notice: Subject to any disclaimer, the term of this patent is extended or adjusted under 35 U.S.C. 154(b) by 0 days.

(21) Appl. No.: 13/934,984

(22) Filed: Jul. 3, 2013

(65) Prior Publication Data
US 2015/0008217 A1    Jan. 8, 2015

(51) Int. Cl.
*B65D 51/04* (2006.01)
*B65D 75/22* (2006.01)
*B65D 43/16* (2006.01)

(52) U.S. Cl.
CPC .............. *B65D 75/22* (2013.01); *B65D 43/162* (2013.01); *Y10T 29/49893* (2015.01)

(58) Field of Classification Search
CPC ..... B65D 43/16; B65D 43/161; B65D 43/162
USPC ............. 220/4.21, 4.23, 4.22, 4.24, 810, 836, 220/837, 838, 839
See application file for complete search history.

(56) References Cited

U.S. PATENT DOCUMENTS

| | | | |
|---|---|---|---|
| 3,633,785 A * | 1/1972 | Cyr et al. | 220/556 |
| 3,876,130 A | 4/1975 | Haase | |
| 5,441,150 A | 8/1995 | Ma | |
| 5,862,930 A | 1/1999 | Orkisz | |
| 5,897,011 A * | 4/1999 | Brilliant et al. | 220/4.23 |
| 6,042,000 A | 3/2000 | Kawamoto | |
| 6,554,147 B1 | 4/2003 | Maida, Jr. et al. | |
| 6,715,632 B2 | 4/2004 | Baker | |
| 8,608,008 B2 * | 12/2013 | Gingras et al. | 220/270 |
| 2003/0066833 A1 | 4/2003 | Chou | |
| 2003/0230582 A1 | 12/2003 | Whitmore et al. | |
| 2005/0035118 A1 * | 2/2005 | Garg et al. | 220/4.23 |

* cited by examiner

*Primary Examiner* — Steven A. Reynolds
*Assistant Examiner* — Javier A Pagan
(74) *Attorney, Agent, or Firm* — Locke Lord LLP; David J. Silvia; Alicia J. Carroll

(57) ABSTRACT

A plastic container includes a first portion including an outwardly extending peripheral flange and a second portion including an outwardly extending peripheral flange. The first portion and the second portion define a container volume. The plastic container also includes a hinge joining the peripheral flange of the first portion and the peripheral flange of the second portion. The hinge includes a pivot line and two arcuate segments proximate to respective ends of the pivot line. The pivot line is tangent the peripheral flange of the first portion and tangent to at least a portion of each arcuate segment. The flange of the first portion can extend further than the flange of the second portion proximate each end of the pivot line to create a seamless periphery about the hinge relative to a periphery of the first portion when the container is closed.

12 Claims, 5 Drawing Sheets

CONTAINER HINGE

BACKGROUND OF THE INVENTION

1. Field of the Invention

The present invention relates to containers and packaging, and more particularly, to containers and packaging that include a hinge joining at least two portions of a container.

2. Description of Related Art

Containers for packaging, distributing, displaying or otherwise housing various consumer items, particularly perishable foods, are becoming increasingly important. Conventional plastic containers are routinely used to house these various products.

Generally, plastic containers are described as pre-formed containers. These types of containers are usually thermoformed and define an interior volume for the product. Such containers are inexpensive, relatively easy to produce, strong, transparent (e.g., the contents of which can be readily viewed) whilst being aesthetically pleasing. The containers, when closed can provide security for the contents and even prevent exposure of the contents to the atmosphere and general environmental conditions.

Although such conventional methods and systems generally have been considered satisfactory for their intended purpose, there still remains a continued need in the art for improved containers, including plastic containers that reduce or prevent potential injury to the consumer. The present disclosure provides a solution for these problems.

SUMMARY

The purpose and advantages of the present invention will be set forth in and become apparent from this disclosure. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a plastic container having a first portion including an outwardly extending peripheral flange and a second portion including an outwardly extending peripheral flange. The first portion and the second portion define a container volume. The container also includes a hinge joining the peripheral flange of the first portion to peripheral flange of the second portion. The hinge has a pivot line tangent the flange of the first portion. Additionally, the flange of the second portion extends further than the flange of the first portion to create a seamless periphery about the hinge relative to a periphery of the container when the first portion and second portion rotate about the pivot line to close the container. Notably, the pivot line can, for example, include one or more score lines, perforation lines, lines of weakness, etc. Such pivot line can be formed, for example, via a laser (e.g., a numerically controlled laser), an intermittent cutter, a progressive punch and die operation, ultrasonic means, hydrodynamic means, etc. Further, the plastic container, including the first portion and the second portion can have various configurations (e.g., circular, rectangular, hexagonal, etc.), and can be made from various materials including, but not limited to polyethylene terephthalate, polyethylene, polypropylene and polyvinyl chloride.

In certain embodiments, the hinge includes two opposed arcuate segments. In such embodiments, the pivot line is tangent to at least a portion of each arcuate segment.

In accordance with certain other embodiments, the flange of the first portion and the flange of the second portion are configured and adapted to create a seamless perimeter when the first portion and second portion rotate about the pivot line to close the container. Moreover, the container can include a peripheral skirt that depends from the second portion, while the first portion is configured and adapted to receive the peripheral skirt when the container is closed.

In accordance with certain other embodiments, a method for forming a plastic container includes steps for providing a sheet of plastic material that is at least partially transparent, forming a first portion including an outwardly extending peripheral flange, and forming a second portion including an outwardly extending peripheral flange, the first portion and the second portion defining a container volume. The method for forming the plastic container can further include steps for forming a hinge joining the peripheral flange of first portion and the peripheral flange of the second portion, the hinge having a pivot line (e.g., at least one of a score line, a perforation line, etc.) tangent the peripheral flange of the first portion, wherein the flange of the first portion extends further than the flange of the second portion proximate each end of the pivot line to create a seamless periphery about the hinge relative to a periphery of the first portion when the container is closed. In some embodiments, the plastic container can be formed from, for example, material that includes at least one of polystyrene, polyethylene terephthalate, polyethylene, polypropylene and polyvinyl chloride.

Additionally, the hinge, the first portion and the second portion can be formed at the same time. With respect to forming the hinge, methods of forming the hinge can include techniques such as one of a numerically controlled laser, an intermittent cutter, a progressive punch and die operation, a ultrasonic system, and a hydrodynamic system. Further, in some embodiments, the hinge can be formed having at least two arcuate segments, with each arcuate segment formed proximate to respective ends of the pivot line. Notably, the pivot line can be formed tangent to at least a portion of each arcuate segment.

When forming the container, the flange of the first portion and the flange of the second portion can be formed to create a seamless perimeter when the first portion and second portion rotate about the pivot line to close the container.

In other additional embodiments, a method is provided for forming a plastic container. The method can include steps for providing a sheet of plastic material that is at least partially transparent, forming a first portion including an outwardly extending peripheral flange, and forming a second portion including an outwardly extending peripheral flange, the first portion and the second portion defining a container volume. Such method can further include a step for forming a hinge joining the peripheral flange of first portion and the peripheral flange of the second portion, wherein the peripheral flange of the second portion is narrower than the peripheral flange of the peripheral flange of the first portion proximate the hinge to provide a smooth perimeter when the container is closed.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
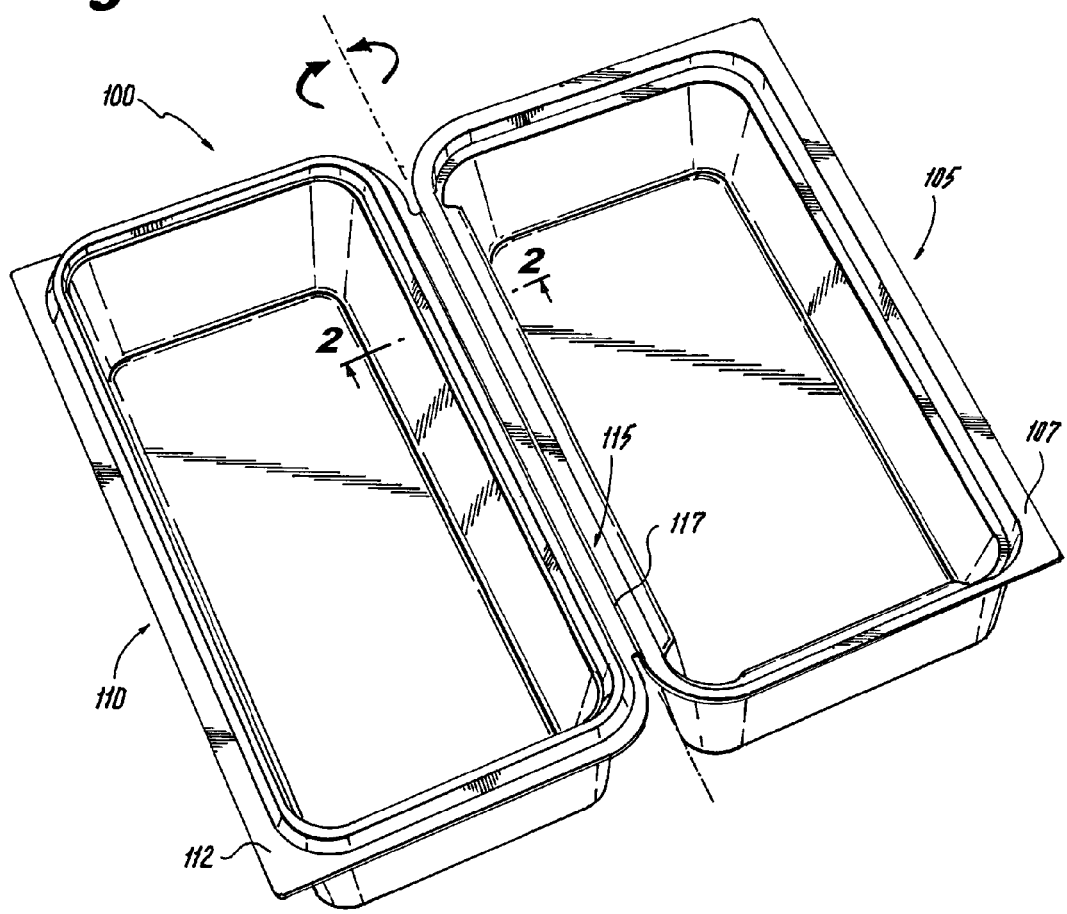
FIG. 1 is a perspective view of a first representative embodiment of a plastic container, shown in the open position.

Reference will now be made to the drawings wherein like reference numerals identify similar structural features or aspects of the subject invention. For purposes of explanation and illustration, and not limitation, a perspective view of an exemplary embodiment of a container in accordance with the invention is shown in FIG. 1 and is designated generally by reference character 100. Other embodiments of containers and hinges in accordance with the invention, or aspects thereof, are provided in FIGS. 2-7, as will be described herein. The apparatus and methods of manufacture thereof can be used in, for example, improved plastic containers, or in any other suitable application.

As shown in FIG. 1, a perspective view of a container 100 is illustrated. Container 100 includes a first portion 105 (e.g., a cover portion) and a second portion 110 (e.g., a base portion), which define a container volume. As shown, container 100 can be a generally rectangular container, circular container, hexagonal container, or any suitably shaped container.

Still referring to FIG. 1, first portion 105 and second portion 110 include respective outwardly extending peripheral flanges—flange 107 and flange 112. Additionally, container 100 includes a hinge 115 joining the first portion 105 to the second portion 110 (e.g., by joining a portion of peripheral flange 107 to a portion of peripheral flange 112). As shown, hinge 115 includes a pivot line 117, which is tangent to flange 107 of the first portion 105. As discussed in greater detail below, first portion 105 and second portion 110 are rotated about pivot line 117 to close the container volume. As discussed in greater detail below, placing pivot line 117 of hinge 115 tangent to flange 107 creates a smooth, seamless or continuous periphery about container 100 when closed. As illustrated, the pivot line 117 is a single score line, however, it is also contemplated that pivot line 117 can include a for example, a plurality of score lines, one or more perforation lines, or the like.

Figure 2:
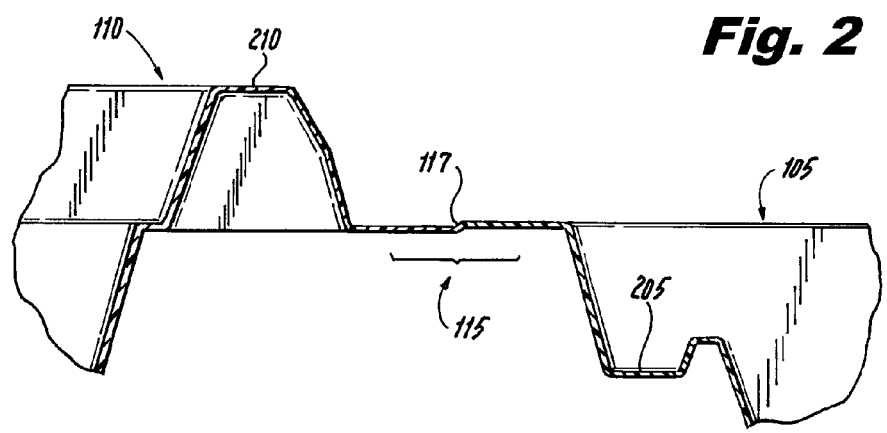
FIG. 2 is a cross-sectional side elevation view of a portion of the container of FIG. 1, showing a hinge between a first and second portion of the container.

Referring now to FIG. 2, a cross-sectional side elevation view of a portion of the container of FIG. 1 viewed at cut line 2-2 of FIG. 1. In accordance with the present disclosure, first portion 105 and second portion 110 include structural features that facilitate forming a non-permanent engagement between first portion 105 and second portion 110. For example, non-permanent engagement between first portion 105 and second portion 110 is facilitated by, among other things, a peripheral skirt 210 depending upwardly from second portion 110 (as oriented in FIG. 2), which when closed, can releasably engage a corresponding mating circumferential recess 205 of first portion 105. In short, peripheral skirt 210 can be seated or received by mating circumferential recess 205 when the container volume is closed.

Figure 3:
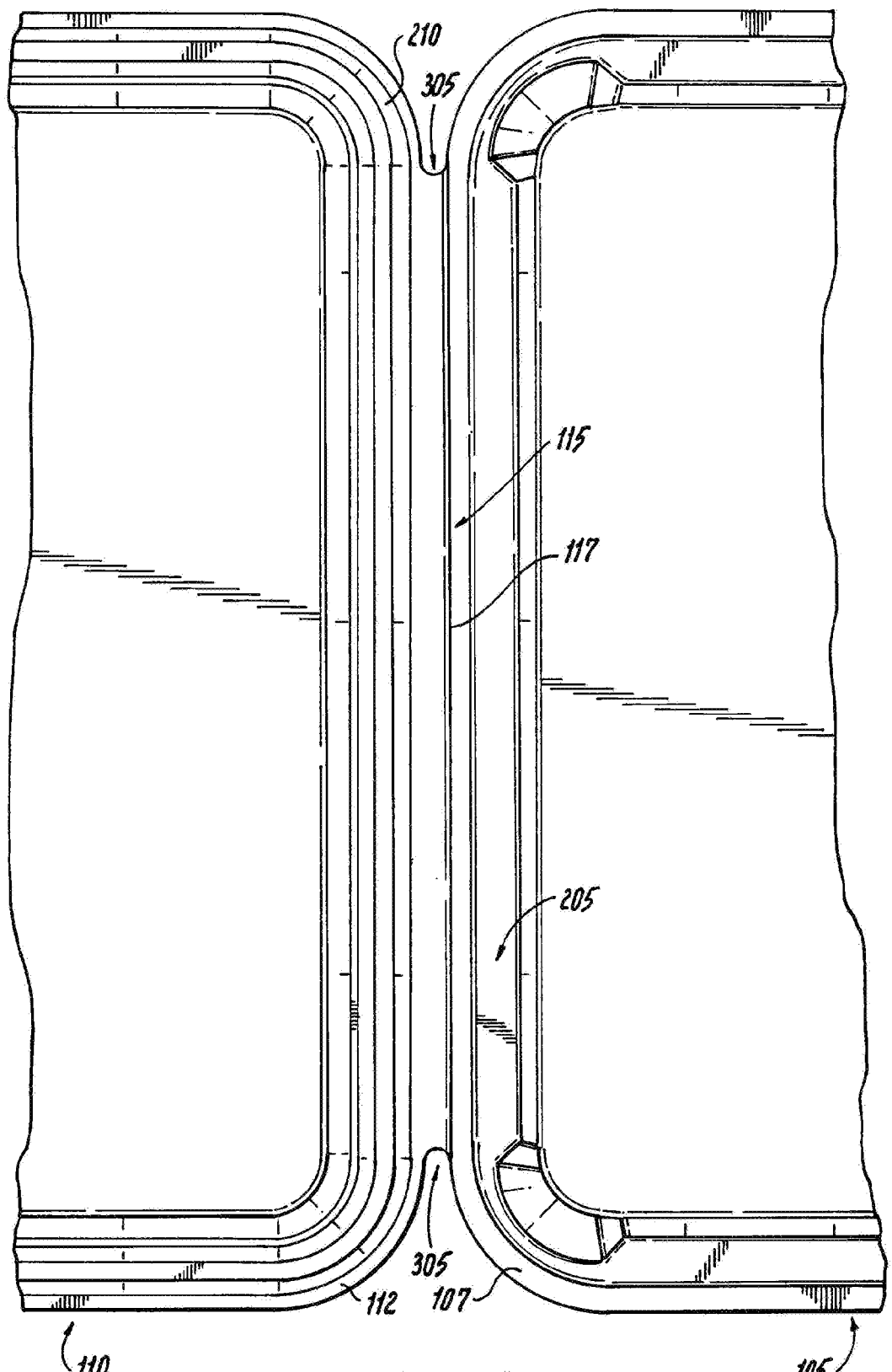
FIG. 3 is a top plan view of the container of FIG. 1, showing arcuate segments of the hinge.

Referring now to FIG. 3, a top plan view of the container of FIG. 1 is shown. In particular, flange 107 of the first portion 105 extends further (e.g., is wider) than flange 112 of the second portion 110 proximate each end of pivot line 117 to create a seamless periphery about the hinge 115 relative to a periphery of the first portion 105 when the container volume is closed. Conversely, flange 112 of the second portion 110 extends less (e.g., is tapered to be thinner) than flange 107 proximate to each end of pivot line 117.

Still referring to FIG. 3, hinge 115 also includes two arcuate segments 305 defined in the perimeter of container 100 in the open position, with each arcuate segment 305 proximate to a respective end of pivot line 117. Notably, pivot line 117 is tangent to a portion of each arcuate segment 305. Placement of pivot line 117 tangent to a portion of each arcuate segment 305 provides a seamless edge or seamless periphery (e.g., a periphery that is smooth and without snags) about container 100 when it is closed, as discussed further below. It is also contemplated that each arcuate segment 305 need not be, in fact, arcuate, but instead, can be any suitable shape (e.g., diagonal, hexagonal, etc.). Additionally, peripheral flange 107 and peripheral flange 112 extend about a circumference of respective corners approaching each arcuate segment 305.

Figure 4:
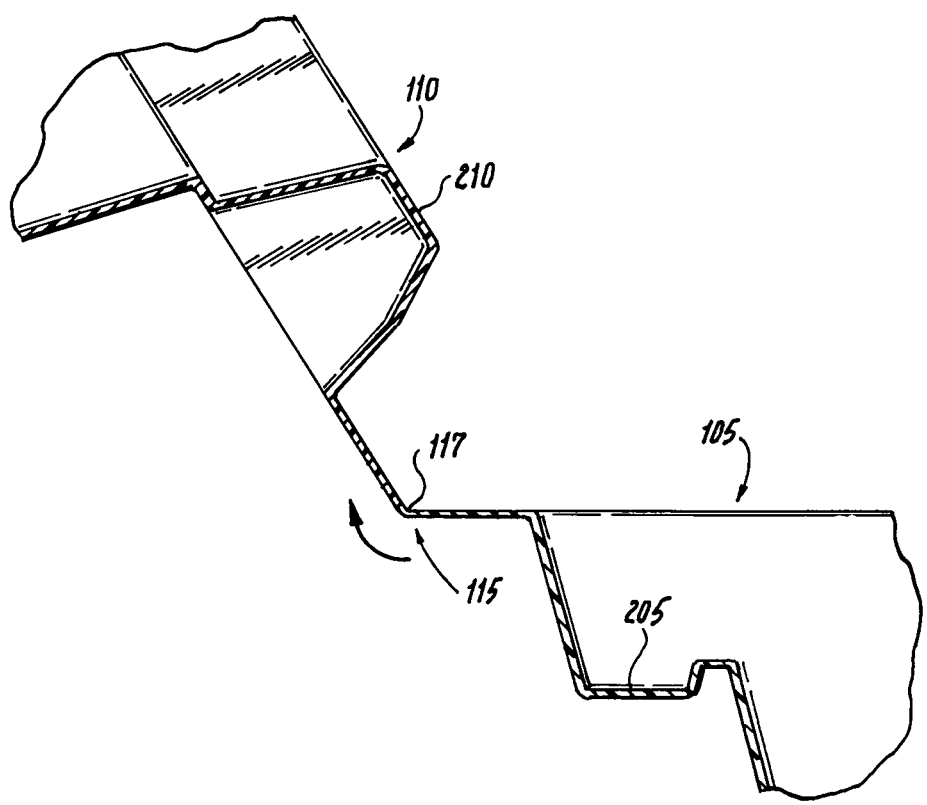
FIG. 4 is a the cross-sectional side elevation view of the container of FIG. 2, showing the first and second portion of the container being closed.

With reference now to FIG. 4, there is shown a cross-sectional side elevation view of the hinge portion shown in FIG. 2, with second portion 110 rotating about pivot line 117 into a closed position as indicated by the heavy arrow. As discussed above, upwardly depending skirt 210 of second portion 110 can be received by a circumferential recess 205 of first portion 105 to releasably engage first portion 105 to second portion 110.

Figure 5:
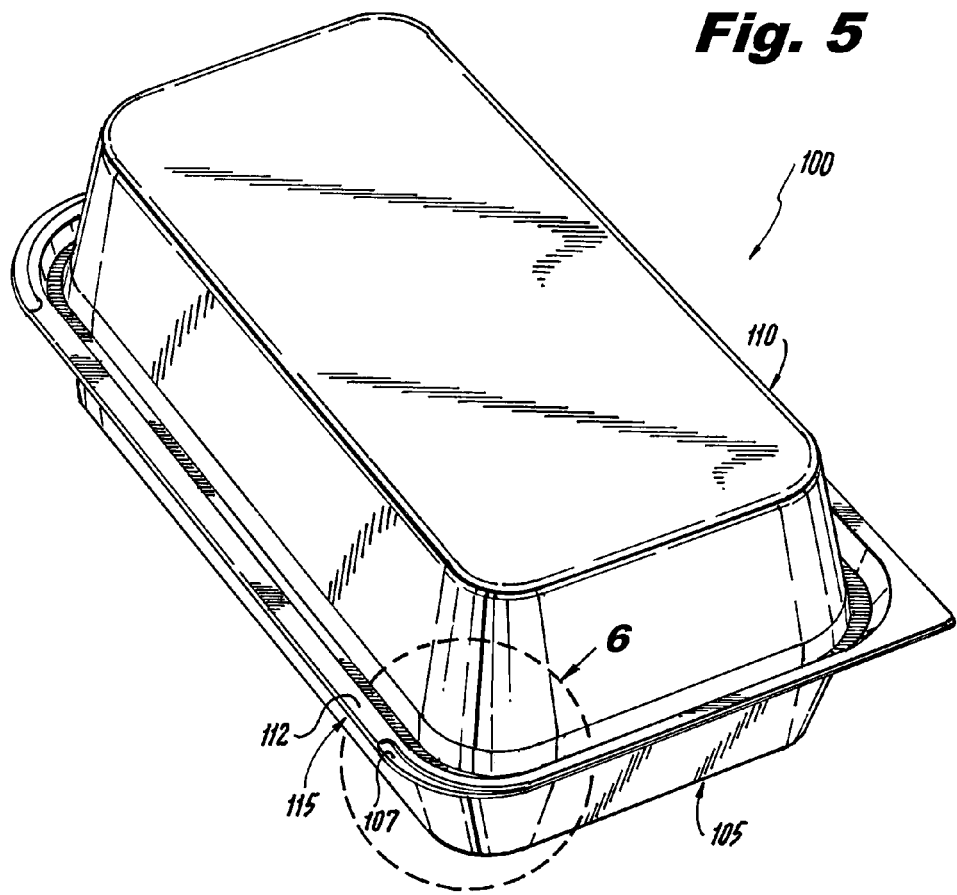
FIG. 5 is a perspective view of the container of FIG. 1, showing the first and second portion in a closed position.
Figure 6:
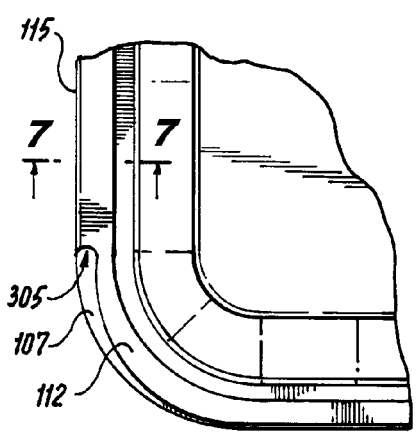
FIG. 6 is a top plan view of a portion of the container of FIG. 5, showing the arcuate segment of the hinge in the closed position.
Figure 7:
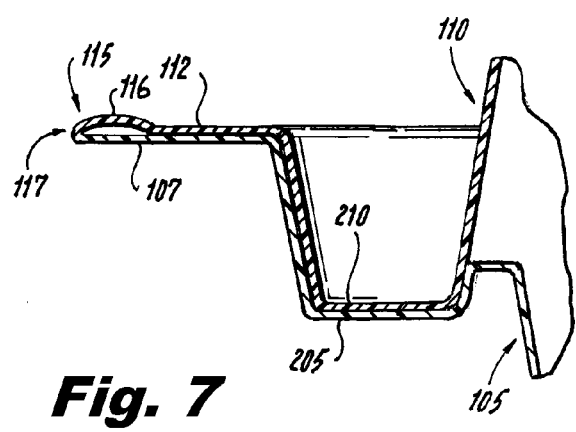
FIG. 7 is a cross-section side elevation view of the container of FIG. 6 taken at cut lines 7-7.
Figure 8:
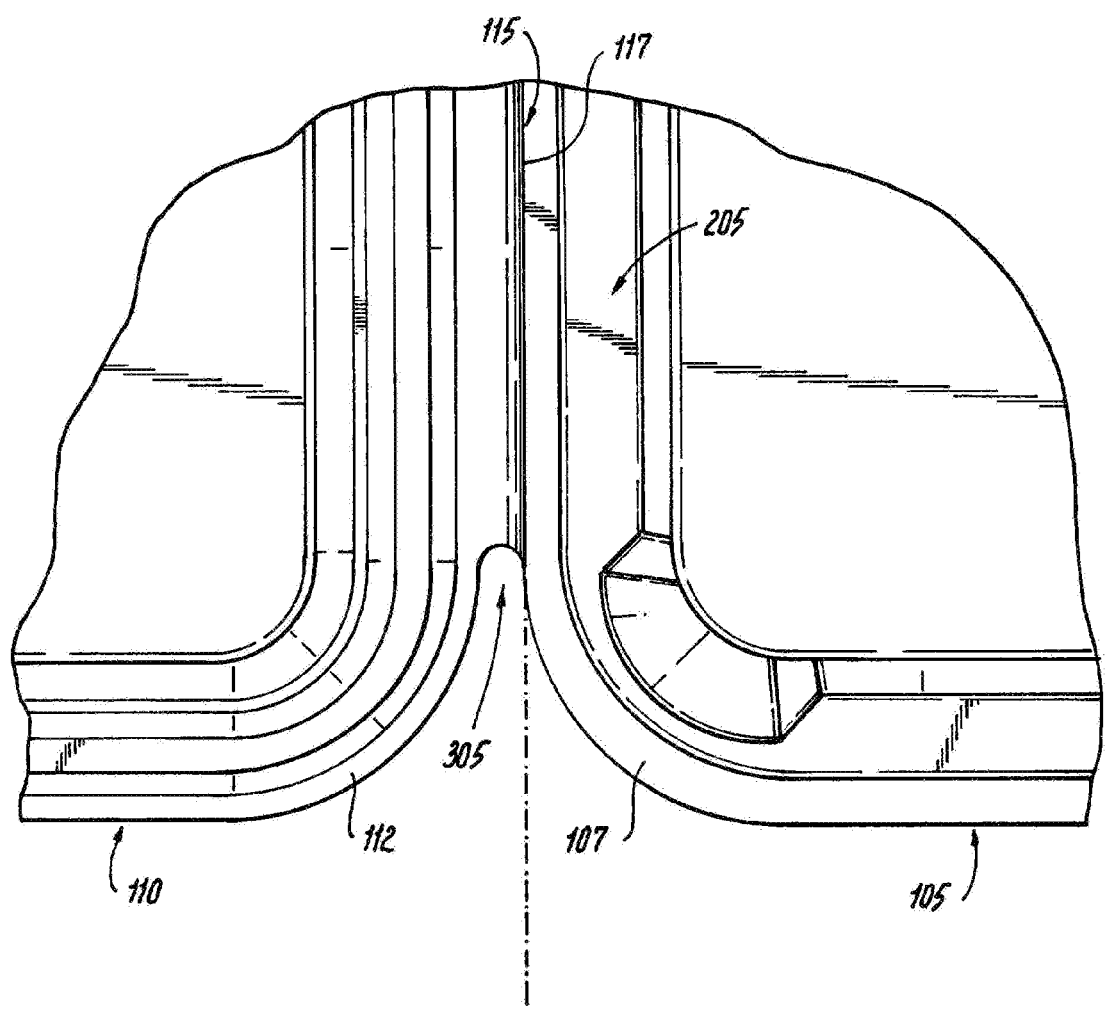
FIG. 8 is an enlarged top plan view of the container of FIG. 3, showing the pivot line being tangent to the peripheral flange of the first portion and to at least a portion of each arcuate segment.

Referring now to FIGS. 5-7, collectively, there is shown various aspects of the container of FIG. 1 in a closed position. For example, FIG. 5 shows a perspective view of container 100 shown in a closed position. When container 100 is closed, peripheral flange 107 and peripheral flange 112 are configured and adapted to create a seamless, smooth and uninterrupted perimeter. Referring to a top plan view of portion 6, shown in FIG. 6, peripheral flange 107 can be configured and adapted to extend further than peripheral flange 112 to create the seamless or continuous perimeter about container 100 when container 100 is closed. That is, a corner portion of flange 107 extends further than a mating corner portion of flange 112. Additionally, as discussed above, placing pivot line 117 of hinge 115 tangent peripheral flange 107, allows a portion of hinge 115 to rotate about pivot line 117 and become, in part, co-planer with peripheral flange 112. For example, referring to FIG. 7, which is a cross-section side elevation view of the container of FIG. 6 taken at cut lines 7-7, a portion of hinge 115 (e.g., a curved portion 116, a portion of hinge 115 immediately adjacent to curved portion 116, etc.) can rotate about pivot line 117 into a closed position and form the seamless periphery about container 100. Further, the portion of hinge 115 immediately adjacent to curved portion 116 can be formed integral with and/or remain co-planer with peripheral flange 112 when the container is closed. Also, when closed, hinge 115 allows flange 107 to become substantially parallel and flush with flange 112.

The techniques and systems described herein and shown in the drawings, provide for a container having superior properties that include various cooperating design elements, including, but not limited to peripheral flanges of respective portions of a container joined by a hinge therebetween. The hinge has a pivot line proximate the peripheral flange of one side, which peripheral flange extends further than the peripheral flange of the other side. Such design elements, cooperate to form a seamless or continuous periphery about the container when the container is closed.

While techniques described herein have been shown and described with reference to preferred embodiments and provide for various configurations that achieve these ends, alternative changes and/or modifications of these configurations will be readily appreciated by those skilled in the art without departing from the spirit and scope of the subject invention.

What is claimed is:

1. A plastic container, comprising:
    a first portion including an outwardly extending peripheral flange;
    a second portion including an outwardly extending peripheral flange, the first portion and the second portion defining a container volume;
    a hinge joining the peripheral flange of first portion and the peripheral flange of the second portion, the hinge having a pivot line about which the first and second portions rotate and two arcuate segments adjacent to respective ends of the pivot line, the pivot line being tangent to the peripheral flange of the first portion and tangent to at least a portion of each arcuate segment; and
    wherein the flange of the first portion extends further than the flange of the second portion adjacent to each end of the pivot line to create a seamless periphery being free of any vertices and cusps about the container when the container is closed.

2. The plastic container as recited in claim 1, wherein the pivot line is at least one of a score line, and a perforation line.

3. The plastic container as recited in claim 1, wherein the flange of the first portion and the flange of the second portion are configured and adapted to create a seamless perimeter interface when the first portion and second portion rotate about the pivot line to close the container.

4. The plastic container as recited in claim 3, wherein a peripheral skirt depends from the second portion, wherein the first portion has a recess configured and adapted to receive the peripheral skirt when the container is closed to releasably engage the second portion to the first portion.

5. The plastic container as recited in claim 1, wherein the first portion and the second portion define a generally rectangular container volume.

6. The plastic container as recited in claim 1, wherein the plastic includes at least one of polystyrene, polyethylene terephthalate, polyethylene, polypropylene and polyvinyl chloride.

7. A plastic container, comprising:
    a cover including an outwardly extending peripheral flange;
    a base including an outwardly extending peripheral flange, the cover and the base defining a container volume;
    a hinge joining the peripheral flange of the cover and the peripheral flange of the base, wherein the hinge includes respective arcuate segments at respective ends of the hinge between the peripheral flange of the cover and the peripheral flange of the base, the hinge having an axis of rotation tangent to the peripheral flange of the cover and tangent to at least a portion of each arcuate segment; and
    wherein the flange of the cover extends further than the flange of the base adjacent to each end of the hinge to create a smooth container perimeter being free of any vertices and cusps when the container is closed.

8. The plastic container as recited in claim 7, wherein the hinge includes at least one of a score line or a perforation line along the axis of rotation.

9. The plastic container as recited in claim 7, wherein the flange of the cover and the flange of the base are configured and adapted to create a seamless perimeter interface when the cover and base rotate about the axis of rotation to close the container.

10. The plastic container as recited in claim 9, wherein a peripheral skirt depends from the base, wherein the cover has a recess configured and adapted to receive the peripheral skirt when the container is closed to releasably engage the base to the cover.

11. The plastic container as recited in claim 7, wherein the cover and the base define a generally rectangular container volume.

12. The plastic container as recited in claim 7, wherein the plastic includes at least one of polystyrene, polyethylene terephthalate, polyethylene, polypropylene and polyvinyl chloride.

* * * * *